United States Patent [19]
Matsuda et al.

[11] Patent Number: 4,650,023
[45] Date of Patent: Mar. 17, 1987

[54] REAR WHEEL STEERING DEVICE FOR MOTORCYCLES

[75] Inventors: Atsushi Matsuda, Iwata; Toshiyuki Sato, Fukuroi, both of Japan

[73] Assignee: Yamaha Hatsudoki Kabushiki Kaisha, Iwata, Japan

[21] Appl. No.: 839,042

[22] Filed: Mar. 12, 1986

[30] Foreign Application Priority Data

Mar. 15, 1985 [JP] Japan ................................. 60-50286
Mar. 15, 1985 [JP] Japan ................................. 60-50287

[51] Int. Cl.⁴ ........................ B62K 21/00; B62K 25/04
[52] U.S. Cl. ...................................... 180/219; 180/227
[58] Field of Search ............... 180/219, 220, 222, 223, 180/224, 227; 280/267, 269, 266

[56] References Cited

U.S. PATENT DOCUMENTS

| 602,034 | 4/1898 | Murphy | 280/266 |
| 2,920,709 | 1/1960 | Holmes et al. | 180/254 |
| 4,157,739 | 6/1979 | Frye | 180/224 |

Primary Examiner—John A. Pekar
Attorney, Agent, or Firm—Ernest A. Beutler

[57] ABSTRACT

Several embodiments of steering arrangement for the rear wheel of a motorcycle wherein the wheel is steered from the side opposite to that which is driven. In some embodiments, a cantilevered trailing arm is employed for suspending the rear wheel that extends only on the driven side and in other embodiments the trailing arm has a pair of arms that are spaced on opposite sides of the wheel. In some embodiments, a brake assembly is provided on the driven side of the rear wheel and in another embodiment, the brake is provided on the steered side of the rear wheel.

16 Claims, 9 Drawing Figures

REAR WHEEL STEERING DEVICE FOR MOTORCYCLES

BACKGROUND OF THE INVENTION

This invention relates to a rear wheel steering device for motorcycles and more particularly to an improved and simplified arrangement for steering both the front and rear wheels of a vehicle such as a motorcycle and for driving and suspending the rear wheel.

Most vehicles intended for use on public roads for transportation are designed so that they include one or more steered front wheels and one or more non-steered rear wheels. Motorcycles are typical examples of this type of vehicle wherein there is a steered front wheel and a non-steered driven rear wheel. Although such an arrangement offers the advantage of simplicity, it does not necessarily offer the best handling when rounding curves or changing directions. That is, when turning, the front wheels is steered into the direction of the turn but the rear wheel is still pointed in a direction tending to go straight ahead. This can cause difficulties in handling.

It is, therefore, a principal object of this invention to provide an improved steering arrangement for vehicles wherein both the front and rear wheels are steered.

It is a further object of this invention to provide a steering mechanism for vehicles that will improve their handling.

In connection with the application of the rear wheel steering principle to a vehicle wherein the rear wheel is additionally driven, certain problems present themself. If the driving mechanism for the rear wheel is positioned at one side of the wheel, as it is in most applications and particularly in motorcycles where the wheel is driven at one side by either a chain or a drive shaft, it is desirable to insure that the linkage system for steering the rear wheel does not interfere with the mechanism for driving the rear wheel. That is, it should be insured that the steering and driving mechanisms do not interfere with or damage each other.

It is, therefore, a still further object of this invention to provide an improved method for steering and driving a rear wheel of a vehicle.

It is another object of this invention to provide a rear wheel steering and driving mechanism wherein the steering and driving mechanisms do not interfere with each other.

In connection with many of the arrangements proposed for steering the rear wheels of a motorcycle, the rear wheel is suspended by a so-called "cantilevered type" trailing arm assembly for suspension movement. If such a cantilevered suspension arm is employed, there is the possibility that the rear wheel may be subjected to forces that might to tend it to cause it to steer. Furthermore, such arrangements may not offer the same strength in some applications as a twin trailing arm arrangement wherein the rear wheel is suspended by an arm that extends on each side of it.

It is, therefore, a still further object of this invention to provide an improved method for suspending driving and steering the rear wheel of a motorcycle.

SUMMARY OF THE INVENTION

A first feature of this invention is adapted to be embodied in a vehicle having at least one dirigible front wheel steered by an operator and at least one rear wheel. The rear wheel is driven at one side thereof. Means are provided for supporting the rear wheel for steering movement and means mechanically couple the front wheel to the rear wheel at the other side thereof for simultaneous steering movement.

Another feature of this invention is adapted to be embodied in a vehicle having at least one dirigible front wheel steered by an operator and at least one rear wheel. The rear wheel is suspended for movement by a trailing arm and the trailing arm has portions that lie on each side of the rear wheel and define an axis about which the rear wheel rotates. In addition, the rear wheel is supported for steering movement and means mechanically couple the front wheel to the rear wheel for simultaneous steering movement.

DETAILED DESCRIPTION OF THE PREFERRED EMBODIMENTS

Figure 1:
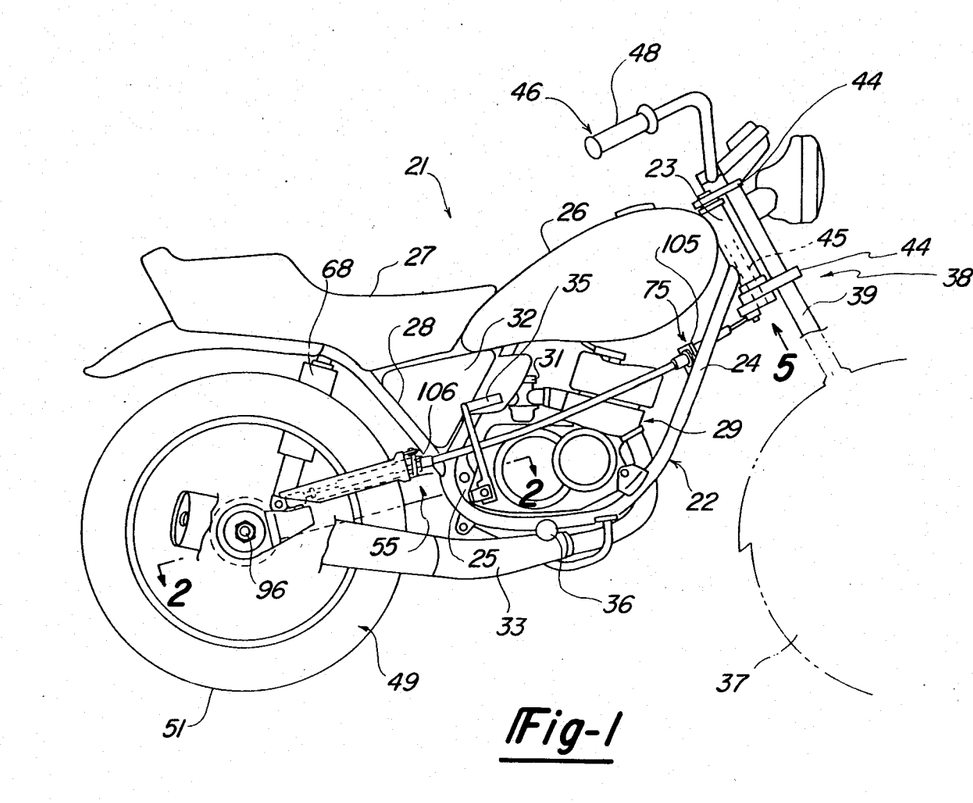
FIG. 1 is a side elevational view, with portions shown in phantom, of a motorcycle constructed in accordance with a first embodiment of the invention.
Figures 2, 4:
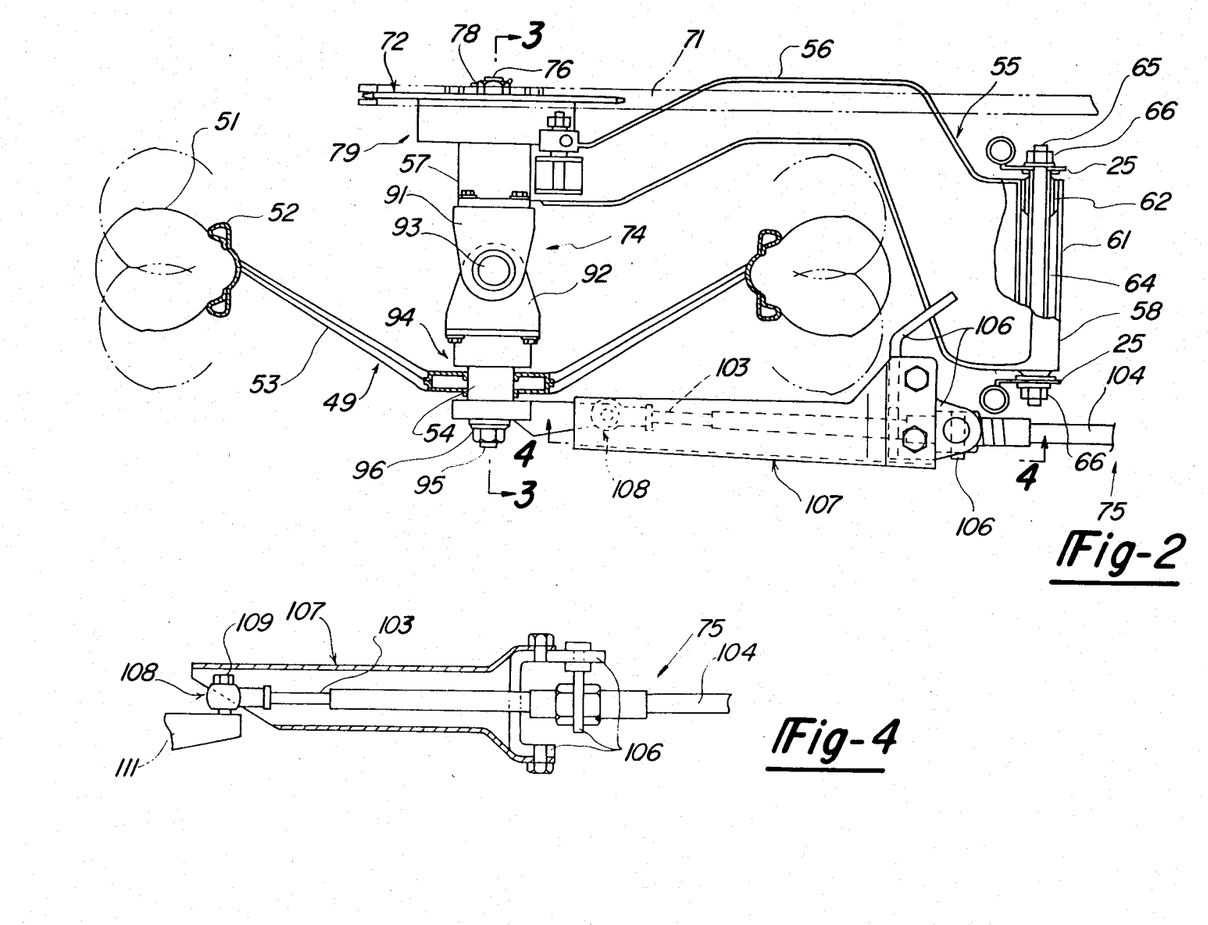
FIG. 2 is a top plan view looking generally in the direction of the line 2—2 in FIG. 1, with portions shown in phantom.
FIG. 4 is a cross-sectional view taken along the line 4—4 of FIG. 2.

Referring first to the embodiment of FIGS. 1 through 5 and initially primarily to FIGS. 1 and 2, a motorcycle constructed in accordance with this embodiment is identified generally by the reference numeral 21. The motorcycle 21 includes a frame assembly, indicated generally by the reference numeral 22, and which may be of any known type. In the illustrated embodiment, the frame assembly 22 is depicted as being made up of a welded tubular construction including a head pipe 23, a main tube 20 (FIG. 5), a down tube 24 and brackets 25 that are affixed to the down tube and a rearwardly and downwardly projecting portions of the main tube. A fuel tank 26 is supported on the main tube and is positioned forwardly of a seat 27 that is supported on a seat rail and a seat pillar rail 28 of the frame assembly 22. Since the frame assembly per se forms no part of the invention, a further description of it is believed to be unnecessary.

An internal combustion engine, indicated generally by the reference numeral 29, is supported within the frame assembly 22 in a known manner. In the illustrated embodiment, the engine 29 is depicted as being of the reciprocating type and has one or more cylinders that receive a fuel/air charge from a carburetor 31 that is positioned rearwardly of the cylinder block and which extends in a generally horizontal direction. An air cleaner and air silencer assembly 32, which is positioned within the frame 22 rearwardly of the carburetor 31 and beneath the seat 27, supplies air to the carburetor 31. In addition, the engine 29 is provided with an exhaust system 33 for silencing the exhaust gases and discharging them to the atmosphere. The engine 29 also includes a combined crankcase, transmission assembly that drives an output shaft (not shown) at any of a plurality of selected speed ratios.

A kick starter assembly 35 is provided at one side of the engine 29 for its starting. In addition, a pair of foot pegs 36 are supported by the frame assembly 22 and extend outwardly from the sides thereof to afford a rest for the rider's feet.

A front wheel 37 is supported from the forward portion of the frame assembly 22 and specifically the head pipe 23 for steering and suspension movement by means of a front wheel steering assembly, indicated generally by the reference numeral 38. The front wheel steering assembly 38 includes a front fork 39 having a tubular suspension system of a known type that carries the front wheel 37 for rotation about an axis at its lower end. The wheel 37 is supported for vertical movement relative to an upper portion of the fork 39 so as to accommodate controlled suspension movement for the front wheel 37.

Upper and lower brackets 44 connect the front fork upper portion 39 to a steering shaft 45 that is journaled for rotation about a front steering axis in the head pipe 23. A handlebar assembly 46 is connected to the brackets 44 and steering shaft 45 in a known manner. The handlebar 46 carries hand grips 48 at its outer end. It should be readily apparent that a rider positioned on the seat 27 may steer the front wheel 37 through the hand grips 48 and handlebar 46.

A driven rear wheel assembly, indicated generally by the reference numeral 49, is carried at the rear end of the frame assembly 22 in a manner to be described. The rear wheel 49 includes a tire 51 that is mounted on a rim 52 that is carried by spokes 53 and connected to a hub portion 54.

It should be noted that the motorcycle 21 as thus far described is generally conventional in configuration and, for that reason, only the general construction has been described in detail.

The rear wheel 49 is supported for suspension movement relative to the frame 22 by means that include a trailing arm assembly, indicated generally by the reference numeral 55 and shown in most detail in FIG. 2. Because of differences which will be described, the trailing arm assembly 53 includes one rearwardly extending arm portion 56 that lies on only one side of the rear wheel assembly 49 and which supports the rear wheel assembly by means of a hub carrier 57 that is fixed at its trailing end in a manner to be described. Forwardly of the rearwardly extending portion 56, the trailing arm 55 has a main portion 58 that extends substantially across the width of the motorcycle between the brackets 25 and which is formed of a welded up box section 59. This box section 59 has a tube 61 carried at its forward end, which tube is, in turn, journaled on a pair of axial spaced bushings 62 that are, in turn, journaled on a shaft 64 that is carried in the brackets 25. The shaft 64 is held in place by means of an elongated bolt 65 that extends through the interior of the shaft 64 and which is held in place by a nuts 66.

The suspension travel of the rear wheel 49 and trailing arm 55 is controlled by a combined coil spring and shock absorber unit 68 that is loaded between the rear end of the arm portion 56 and the frame 22 at a point contiguous to where the seat pillar 28 joins the seat rail.

The rear wheel 49 is driven from one of its sides and to this end a driving sprocket (not shown) is affixed to the engine transmission output shaft. A driving chain 71 encircles the sprocket 69 and a driven sprocket 72 that is affixed for rotation with the rear wheel 49 in a manner which will be described. A chain tensioner (not shown) is carried by the trailing arm 55 so as to maintain uniform tension on the driving chain 71 during its suspension movement.

In addition to being driven and supported for suspension movement, the rear wheel assembly 49 is also supported for steering movement by means of a steering support, indicated generally by the reference numeral 74. The steering support 74 is designed so as to provide a steering axis that passes through the transverse center of the rear wheel assembly 49 and which lies on a plane passing through the center of the motorcycle 21 and containing the front wheel steering axis. The rear wheel steering axis extends vertically.

The steering of the rear wheel 49 about the steering axis is controlled by means of a steering control mechanism, indicated generally by the reference numeral 75 which connects the front wheel steering mechanism with the rear wheel steering support mechanism 74 in a manner to be described.

Figure 3:
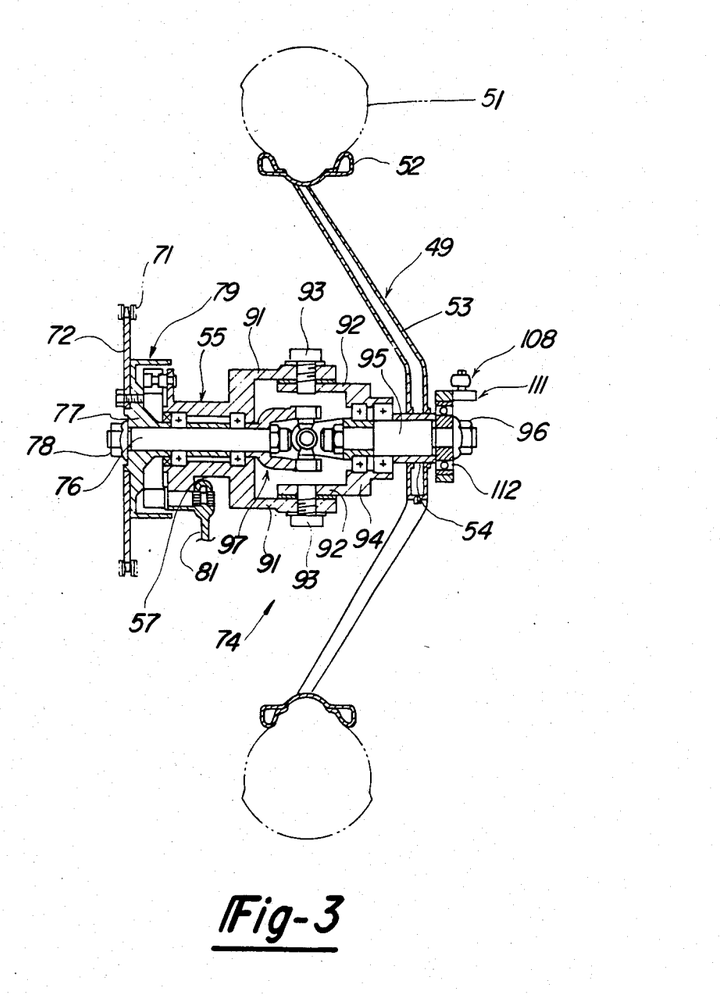
FIG. 3 is a cross-sectional view taken along the line 3—3 of FIG. 2.
Figure 5:
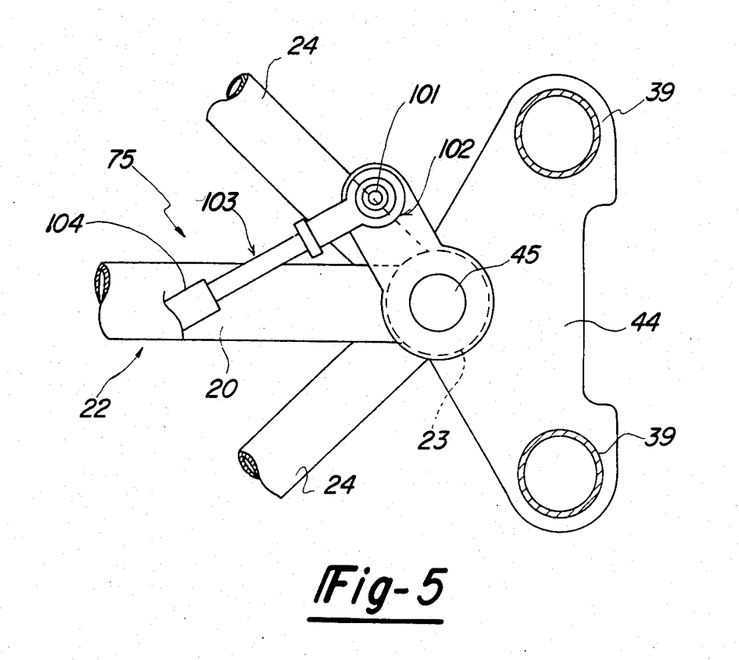
FIG. 5 is an enlarged view taken in the direction of the arrow 5 in FIG. 1.

Referring now primarily to FIGS. 2 and 3, the rear wheel steering support mechanism 74 will be described in detail. The hub carrier 57 has a pair of spaced apart bearings that rotatably journal a shaft 76. The shaft 76 has a splined connection to a hub member 77 which is, in turn, affixed to the sprocket 72 by means of bolt assemblies. The sprocket 72 and hub member 77 are axially affixed to the shaft 76 by means of a nut 78.

The hub member 77 forms a portion of a drum brake assembly, indicated by the reference numeral 79. This drum brake assembly includes an operating lever 81 that is actuated in an known manner.

The hub carrier 57 has affixed to it a bifurcated member 91 which, in turn, is pivotally connected to a second bifurcated member 92 by means of a pair of vertically disposed pivot pins 93. The pivot axis between the bifurcated members 91 and 92 defined by the pivot pins 93 lies on the steering axis of the rear wheel assembly 49 and also within the motorcycle center plane.

The further bifurcated member 92 is affixed to a second hub carrier 94 which, in turn, journals a shaft 95 by means of a pair of spaced bearings. The shaft 95 is nonrotatably affixed to the rear wheel hub 54 by a splined connection and the hub 54 is held axially onto the shaft 95 by means of a retainer nut 96.

The shafts 76 and 95 are rotatably coupled by means of a universal joint 97 that has its respectively members affixed to the shafts 76 and 95. The universal joint 97 has its pivotal axis lying within the motorcycle center plane and on the rear wheel steering axis so that the steering movement of the rear wheel assembly 49 will not interfere with the driving forces transmitted to the rear wheel through the universal joint 97. These points pass through the center of the rear wheel assembly 49 and specifically its rim 52 and the tire 51.

The steering control mechanism 75 is provided for mechanically coupling the front wheel steering mechanism to the mechanism for steering the rear wheel 74 so that both wheels will be steered in unison. This mechanism includes a pin 101 (FIG. 5) that is affixed to a lever carried by the lowermost fork bracket 44 at a point offset from the front steering axis. A trunion member 102 connects the pin 101 to one end of a flexible transmitter 103 that is contained within a protective sheath 104. The adjacent forward end of the protective sheath 104 is carried by the down tube 24 and specifically by means of a bracket 105 (FIG. 1) that is connected to it.

The flexible transmitter 103 and its protective sheath 104 cross across the frame 22 and the rear end of the protective sheath 104 is fixed adjustably to a bracket 106 carried by the trailing arm assembly 55 (FIG. 2). The rear end of the protective sheath 104 and the wire actuator 103 are disposed on the opposite side of the rear wheel 49 from the trailing arm portion 56, the drive chain 71, the driving sprocket 72 and the drum brake assembly 79. This rear portion of the flexible transmitter 103 and protective 104 is protected by means of a protective housing 107 that is affixed to the bracket 106 and which extends rearwardly relative to it.

The rear end of the flexible transmitter 103 carries a trunnion 108 that is connected by means of a pin 109 to a steering arm 111. The steering arm 111 journals the outer end of the shaft 95 for rotation by means of an anti-friction bearing 112.

The steering operation of this embodiment will now be described. If the rider steers the front wheel 37 by rotating the handlebars 46 and front wheel 37 about its steering axis, there will be a force exerted on the flexible transmitter 103. This force is transmitted to the steering arm 111 to move it forward or rearward to pivot the shaft 95 and steer the rear wheel 49. Thus, both the front and rear wheels will be steered and in this embodiment the steering is in the same direction. The mechanical arrangement of the linkage system is such, however, that the angle of steering movement of the rear wheel 49 will be less than the angle of steering movement of the front wheel 37, for example, about 20% or less of the front wheel steering.

Because of the use of the flexible transmitter for transmitting the steering motion from the front to rear wheel, the suspension movement of the rear wheel 49 is easily accommodated and there will be no feedback or steering of the rear wheel 49 merely due to the suspension movement per se. Also, the steering mechanism 75 is clear of the rear wheel drive and there will be no interference.

Figure 6:
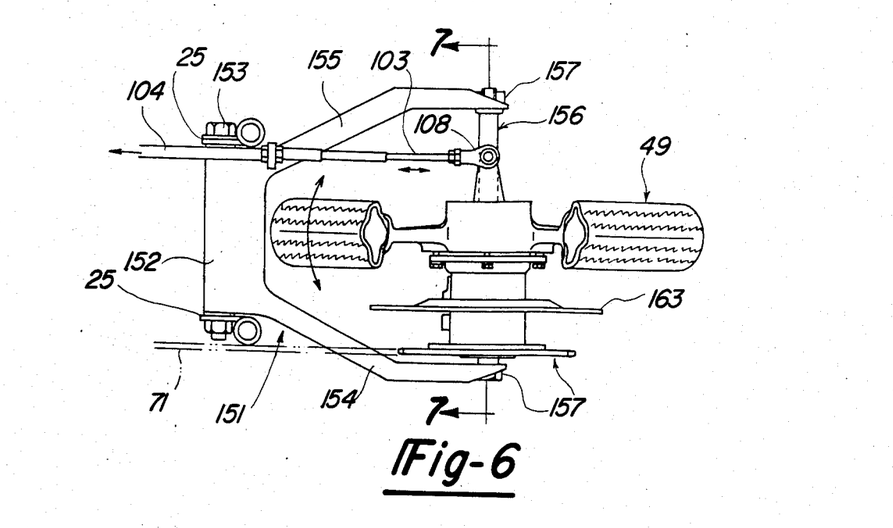
FIG. 6 is a view, in part similar to FIG. 2, showing the construction of another embodiment of the invention.
Figure 7:
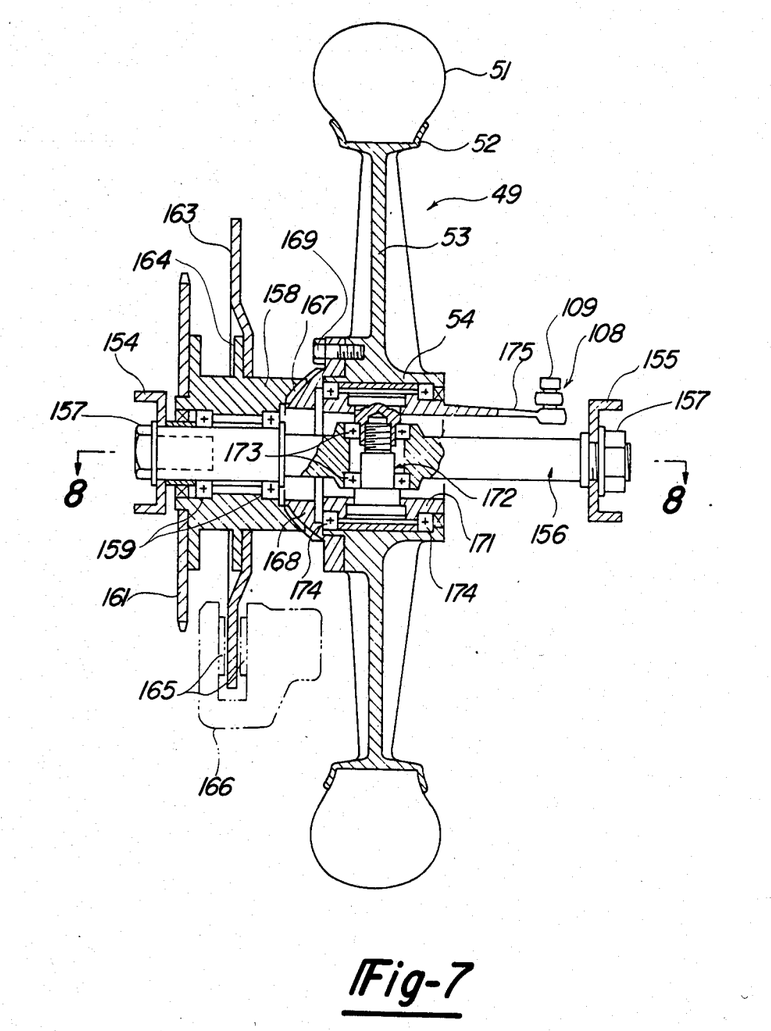
FIG. 7 is an enlarged cross-sectional view taken along the line 7—7 of FIG. 6.
Figure 8:
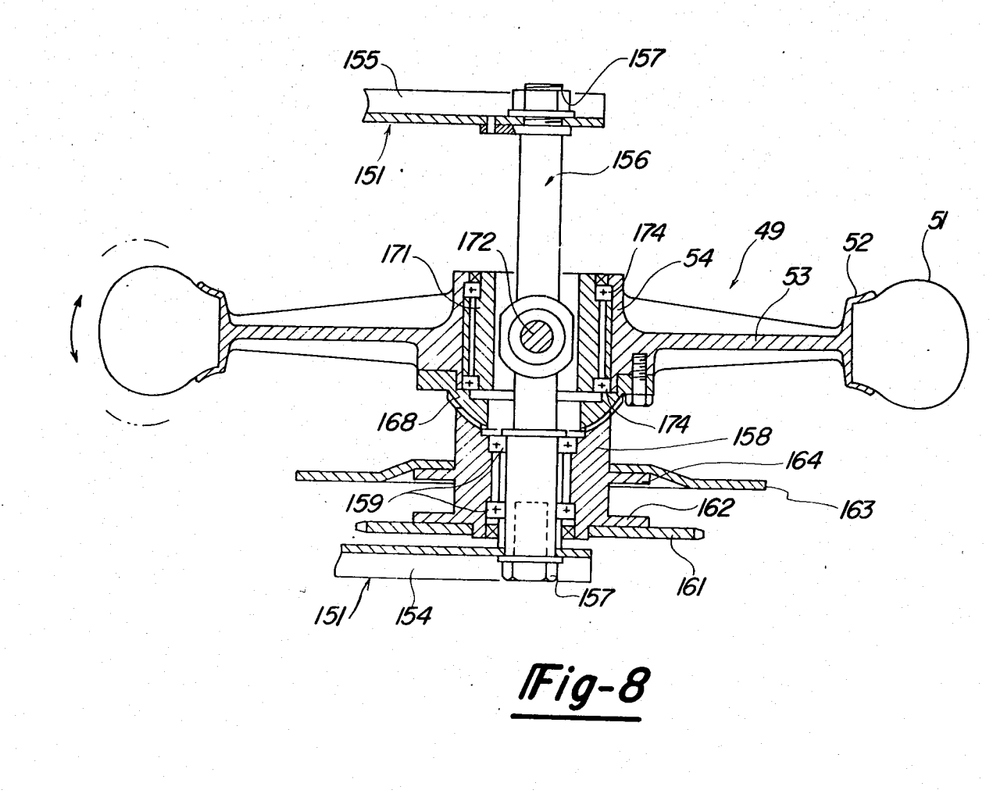
FIG. 8 is a cross-sectional view taken along the line 8—8 of FIG. 7.

In the embodiment of FIGS. 1 through 5, the rear wheel assembly 49 was supported by a trailing arm assembly that was of the centilevered type. That is, it had only one arm portion that extended on the driven side of the rear wheel. Although this construction has the advantages of simplicity, in some instances, it may be desirable to provide support for both sides of the rar wheel and such an embodiment is shown in FIGS. 6 through 8. In this embodiment, only the manner of suspension of the rear wheel differs from the previously described embodiment and hence only that portion of the construction has been illustrated and will be described. Components which are the same as the previously described embodiment have been identified by the same reference numerals and will not be described again, except insofar as is necessary to understand the construction and operation of this embodiment.

In this embodiment, a trailing arm assembly, indicated generally by the reference numeral 151, is provided for supporting the rear wheel assembly 49. The trailing arm assembly 151 has a forward portion 152 that spans the area between the frame back brackets 25 and which is pivotally supported upon them by means of a pivot assembly 153 which may be constructed as in the previously described embodiment. From the portion 152, the trailing arm 151 has a pair of rearwardly extending arm parts 154 and 155 that extend on opposite sides of the rear wheel assembly 49. The arm portion 154 extends on the driven side of the rear wheel assembly 49 while the portion 155 extends on the steered portion of the rear wheel 49.

A non-rotating shaft, indicated generally by the reference numeral 156, extends between the arm portions 154 and 155 and is affixed to them by retainer nuts 157. A hub 158 is rotatably journaled on the side of the shaft portion 156 adjacent the arm 154 by means of a pair of axially spaced anti-friction bearings 159. The hub 158 has non-rotatably affixed to it a driven sprocket 161 which is driven by the engine driven chain 71. A flange 162 may be provided on the hub 158 to facilitate this connection. A disk brake rotor 163 is, in a like manner, affixed to a flange 164 formed on the hub 158 so as to rotate with it. The brake rotor 163 is adapted to be engaged by a pair of brake pads 165 that are operated by means of a sliding caliper assembly 166 for braking the rotation of the rear wheel 49. The manner of support for the caliper assembly 166 and its method of actuation may be of any known type.

The inner face of the hub 158 is provided with a plurality of spherical splines 167 that cooperate with corresponding splines formed on a hub piece 168 that is affixed, as by means of bolts 169, to the hub 54 of the wheel 49. The splined connection between the hubs 158 and 168 provides a universal type joint that will permit the wheel 49 to rotate about a steering axis (to be described) while maintaining the driving relationship between the hubs 158 and 168. This type of joint is well known in front wheel drive and other applications and those skilled in the art may adapt any known joint of this type for driving and permitting steering movement of the rear wheel 49.

A hub carrier 171 surrounds the central portion of the shaft assembly 156 and is pivotally connected to it for steering movement about a generally vertically extending steering axis by means of a pivot pin 172 and anti-friction bearings 173. The hub carrier 171, in turn, rotatably journals to the hub 54 of the wheel 49 by means of a pair of axially spaced wheel bearings 174. The hub carrier 171 is formed with an outstanding steering arm 175 that is connected to the trunnion 108 by the pivot pin 109 for steering movement of the hub 171 and, accordingly, the supported wheel 49 in a manner which is believed to be apparent to those skilled in this art.

Figure 9:
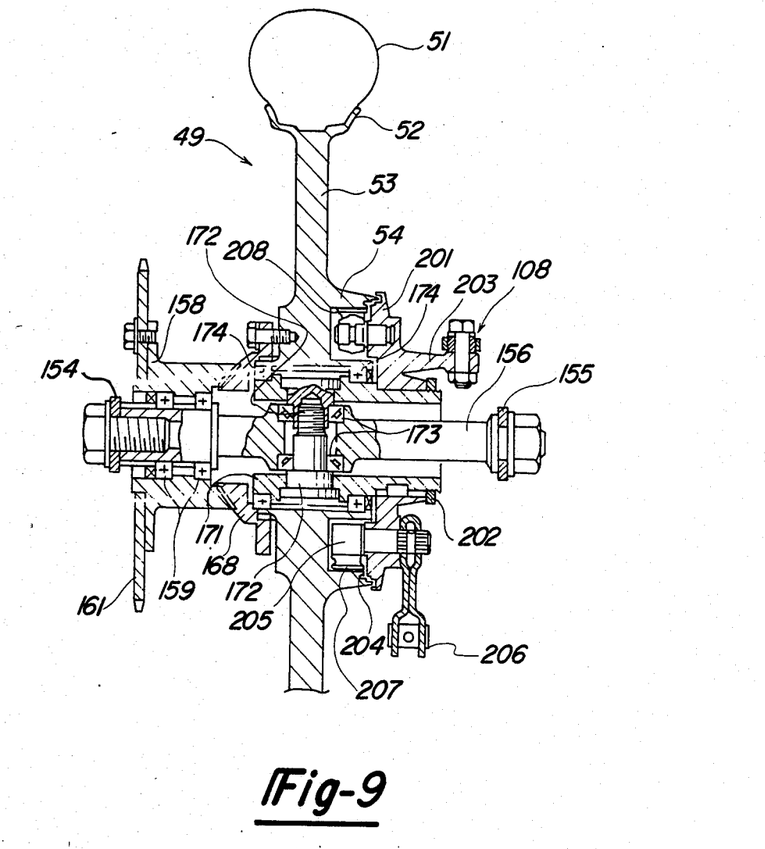
FIG. 9 is a cross-sectional view, in part similar to FIG. 7, showing a still further embodiment of the invention.

In the embodiments thus far described, the brake assembly and drive for the rear wheel 49 were positioned on the same side of the rear wheel and opposite from the side of the rear wheel which was steered. In some applications, it may be desirable to position the brake and steering arrangement on the same side of the rear wheel and the drive on the opposite side. Such an embodiment is shown in FIG. 9. The embodiment of FIG. 9 is generally similar to the embodiment of FIGS. 6 through 8 and components which are the same have been identified by the same reference numeral and will not be described again in detail.

In this embodiment, the rear wheel 49 is driven from the sprocket 164 by means of a drive coupling as in the embodiment of FIGS. 6 through 8. However, in this embodiment, the steering arm is not formed integrally with the hub carrier 171 but rather is formed integrally with a backing plate 201 that is fixed against rotation relative to the hub carrier 171 and which is axially affixed to it by means of a nut 202. A steering arm 203 is formed integrally with the backing plate 201 and is connected to the trunnion 108 and flexible cable in the same manner as in the previously described embodiments.

In this arrangement, a drum brake assembly, indicated generally by the reference numeral 204 is provided on the same side of the rear wheel 49 as the steering arm 203. This brake assembly includes a cam type actuator 205 that is journaled in the backing plate 201 and which has an actuating lever 206 connected to its exposed end. The actuating lever 206 is operated in a known manner so as to urge a pair of brake shoes 207 into engagement with an annular internal surface 208 formed on the wheel hub 54 which acts as the brake drum for braking the rotation of the rear wheel 49.

It should be readily apparent from the foregoing description that a number of embodiments of the invention have been illustrated and described in which the steering mechanism for the rear wheel is disposed on the opposite side from the rear wheel drive to avoid interference. Although a number of embodiments have been illustrated and described, various other changes and modifications may be made without departing from the spirit and scope of the invention, as defined by the appended claims.

We claim:

1. In a vehicle having at least one dirigible front wheel steered by an operator and at least one rear wheel, means for driving said rear wheel including final drive means affixed for rotation with said rear wheel at one side thereof, and means for supporting said rear wheel for steering movement about a steering axis, the improvement comprising means for mechanically coupling said front wheel to said rear wheel for simultaneous steering movement including a steering lever affixed against relative rotation to said rear wheel about said steering axis and lying on the other side of said rear wheel from said final drive means and contiguous to the axis of rotation of said rear wheel.

2. In a vehicle as set forth in claim 1 further including operator control means for steering the front wheel.

3. In a vehicle as set forth in claim 2 wherein the means for mechanically coupling the front and rear wheel couples the rear wheel steering mechanism to the front wheel steering mechanism.

4. In a vehicle as set forth in claim 3 wherein the coupling means comprises a linkage system.

5. In a vehicle having at least one dirigible front wheel steered by an operator control means and at least one rear wheel, means for driving said rear wheel at one side thereof, and means for supporting said rear wheel for steering movement, the improvement comprising a linkage system for mechanically coupling said front wheel steering mechanism to said rear wheel steering mechanism at the other side thereof for simultaneous steering movement, said front and rear wheels being supported for suspension movement.

6. In a vehicle as set forth in claim 5 wherein the vehicle comprises a motorcycle having only a single steered front wheel and a single steered rear wheel.

7. In a vehicle as set forth in claim 6 wherein the rear wheel is supported for suspension movement by a trailing arm.

8. In a vehicle as set forth in claim 7 wherein the trailing arm is cantilevered and extends on one side of the rear wheel only.

9. In a vehicle as set forth in claim 8 wherein the trailing arm extends on the side of the rear wheel that is driven.

10. In a vehicle as set forth in claim 7 wherein the trailing arm has a pair of spaced apart arms extending on opposite sides of the rear wheel.

11. In a vehicle as set forth in claim 10 wherein the spaced apart arms carry a fixed axle on which the rear wheel rotates.

12. In a vehicle as set forth in claim 6 wherein the linkage system comprises a first lever affixed to a fork of the front wheel, a flexible transmitter having a first end thereof connected to said first lever at a point offset from the steering axis of the front wheel, the steering arm supporting the rear wheel for rotation about a rotational axis and for steering movement about a steering axis, and means for connecting the other end of said flexible transmitter to said rear wheel steering arm.

13. In a vehicle as set forth in claim 12 further including a joint for driving the rear wheel.

14. In a vehicle as set forth in claim 13 wherein the joint for driving the rear wheel comprises a splined joint.

15. In a vehicle as set forth in claim 13 wherein the joint for driving the rear wheel includes a universal joint.

16. A motorcycle having a frame, a dirigible front wheel steered by an operator and carried by said frame, at least one rear wheel supported by said frame for suspension movement by a trailing arm, and means for driving said rear wheel, the improvement comprising means for supporting said rear wheel from said trailing arm for steering movement, said trailing arm having a pair of spaced arm portions lying on opposite sides of said rear wheel, and means for mechanically coupling said front wheel and said rear wheel for simultaneous steering movement.

* * * * *